United States Patent
Woida-O'Brien

(10) Patent No.: US 9,367,035 B2
(45) Date of Patent: Jun. 14, 2016

(54) DIGITAL INFRARED HOLOGRAMS

(71) Applicant: Raytheon Company, Waltham, MA (US)

(72) Inventor: Rigel Q. Woida-O'Brien, Tucson, AZ (US)

(73) Assignee: RAYTHEON COMPANY, Waltham, MA (US)

(*) Notice: Subject to any disclaimer, the term of this patent is extended or adjusted under 35 U.S.C. 154(b) by 137 days.

(21) Appl. No.: 14/153,465

(22) Filed: Jan. 13, 2014

(65) Prior Publication Data

US 2015/0198924 A1 Jul. 16, 2015

(51) Int. Cl.
*G03H 1/02* (2006.01)
*G03H 1/08* (2006.01)
*G03H 1/22* (2006.01)

(52) U.S. Cl.
CPC .............. *G03H 1/0866* (2013.01); *G03H 1/02* (2013.01); *G03H 1/2294* (2013.01); *G03H 2001/0224* (2013.01); *G03H 2222/16* (2013.01); *G03H 2225/24* (2013.01); *G03H 2240/42* (2013.01)

(58) Field of Classification Search
CPC ......... G03H 1/08; G03H 1/04; G03H 1/0402; G03H 1/0866; G03H 1/02
USPC ................................ 359/9, 22, 32; 250/503.1
See application file for complete search history.

(56) References Cited

U.S. PATENT DOCUMENTS

| | | | | |
|---|---|---|---|---|
| 4,455,061 A * | 6/1984 | Case | ............................. | 359/17 |
| 6,967,053 B1 * | 11/2005 | Mullen | ............... | A42B 3/061 |
| | | | | 359/529 |
| 7,315,503 B2 * | 1/2008 | Cho et al. | ............... | 369/112.29 |
| 2013/0271800 A1 * | 10/2013 | Kanugo | ......................... | 359/9 |
| 2014/0111838 A1 * | 4/2014 | Han | ................... | G02B 27/017 |
| | | | | 359/13 |

* cited by examiner

*Primary Examiner* — Bumsuk Won
*Assistant Examiner* — William R Alexander
(74) *Attorney, Agent, or Firm* — Cantor Colburn LLP

(57) ABSTRACT

Embodiments are directed to an apparatus for creating a scene comprising: a plurality of micro-mirrors configured to rotate between an off position and at least two on positions to generate a plurality of holograms, and a processor configured to select positions for the micro-mirrors based on an input specification of the scene.

17 Claims, 7 Drawing Sheets

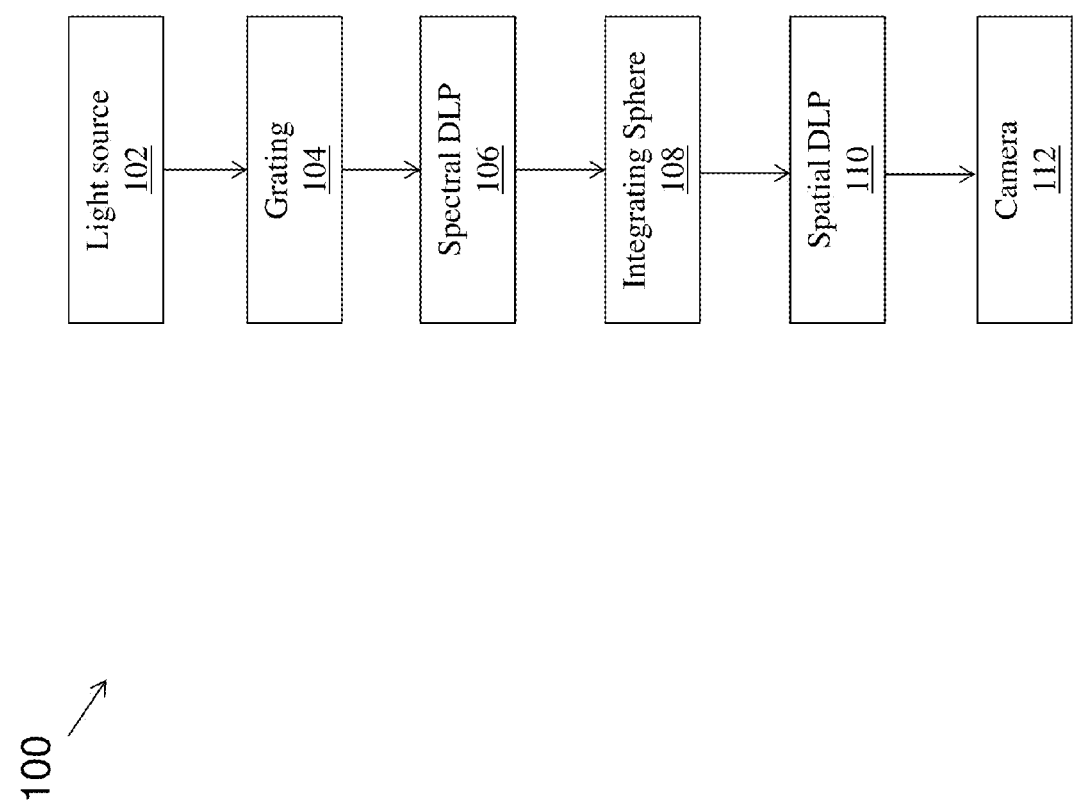

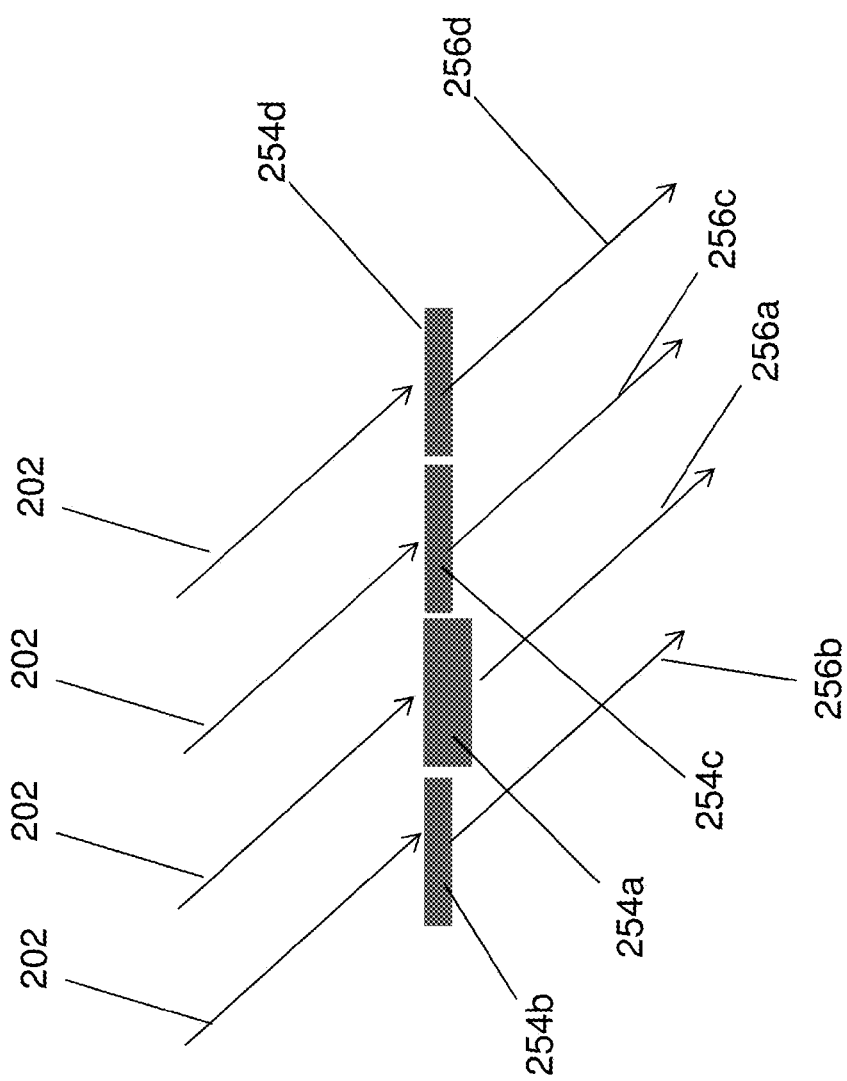

DIGITAL INFRARED HOLOGRAMS

BACKGROUND

The present disclosure relates to computing technology, and more specifically, to the creation of dynamic and updatable infrared (IR) scene projections that are power efficient.

Many people have created scenes using digital light processing (DLP) technology or digital micromirror devices (DMDs). DLP/DMD may be used to create a robust series of images such that the when the images are shown in sequence a dynamic or "life-like" scene may be created. However, traditional DLP/DMD technology is inefficient in terms of power; an efficiency of 0.1% may be realized in some applications.

Scenes have also been created using holograph technology. Holograph technology represents an improvement over DLP/DMD technology in terms of power efficiency. For example, a power efficiency of 25-90% may be realized using holograph technology. However, the scenes created using holograph technology tend to be static in nature, lacking the dynamic feature-set associated with DLP/DMD technology.

SUMMARY

According to one embodiment, a method comprises: receiving an input specification of a scene, selecting a position for a plurality of micro-mirrors based on the input specification to generate a plurality of holograms, wherein the micro-mirrors are configured to rotate between an off position and at least two on positions.

According to another embodiment, an apparatus for creating a scene comprises: a plurality of micro-mirrors configured to rotate between an off position and at least two on positions to generate a plurality of holograms, and a processor configured to select positions for the micro-mirrors based on an input specification of the scene.

According to another embodiment, a system comprises: a light source configured to emit light, at least one digital light processing (DLP) device configured to receive the light to generate an infrared (IR) scene, wherein the at least one DLP device comprises a plurality of micro-mirrors arranged in groupings of four micro-mirrors, and wherein each of the micro-mirrors is configured to rotate between an off position and at least two on positions, and wherein each of the micro-mirrors comprises a lip proximate to an apex of the micro-mirror, and wherein a position for each of the micro-mirrors is selected to create a plurality of holograms that are used to create the scene.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

For a more complete understanding of this disclosure, reference is now made to the following brief description, taken in connection with the accompanying drawings and detailed description, wherein like reference numerals represent like parts:

FIG. 1 is a block diagram of an exemplary system;

FIG. 2B illustrates the generation of an OPD based on refraction;

DETAILED DESCRIPTION

Figure 2A:
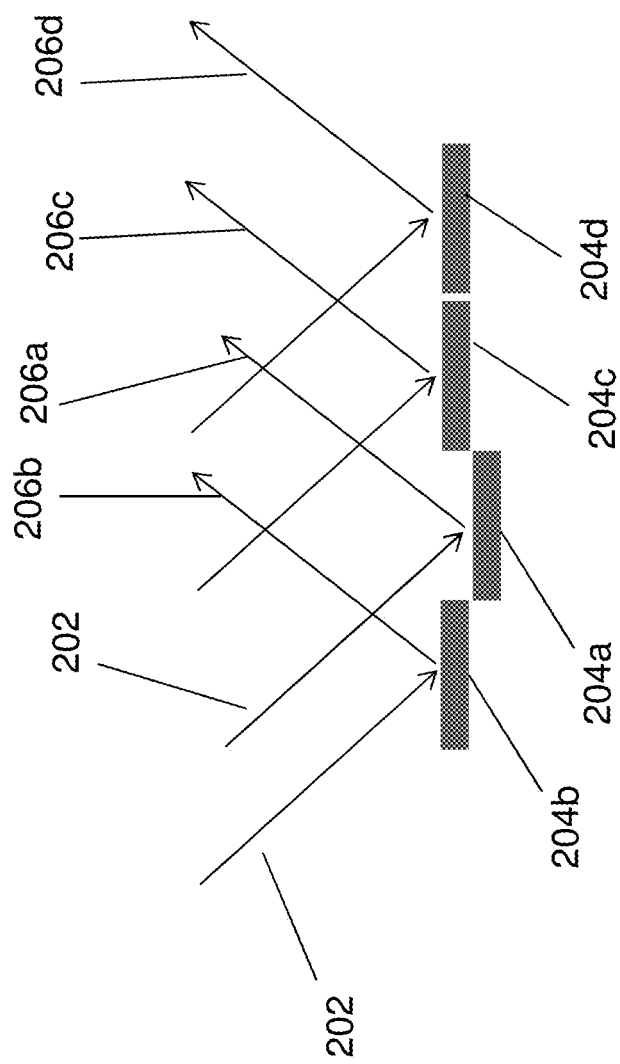
FIG. 2A illustrates the generation of an optical path difference (OPD) based on reflection.

It is noted that various connections are set forth between elements in the following description and in the drawings (the contents of which are included in this disclosure by way of reference). It is noted that these connections in general and, unless specified otherwise, may be direct or indirect and that this specification is not intended to be limiting in this respect. In this respect, a coupling between entities may refer to either a direct or an indirect connection.

Exemplary embodiments of apparatuses, systems, and methods are described for generating dynamic scenes in a power-efficient way. In some embodiments, an optical path difference (OPD) may be adjusted based on a movement or rotation of one or more mirrors (e.g., micromirrors). The movement of the mirrors at relatively high frequencies may be used to create a sequence of images that differ from one another in subtle ways, such that a dynamic or life-like scene may be generated.

Referring to FIG. 1, a system 100 is shown. In particular, a flow of light as conditioned by various entities and components in the system 100 is shown. The light may originate from a light source 102. The light source 102 may include a white light source, such that all color photons that are needed may be provided.

The light from the light source 102 may be provided to a grating 104. The grating 104 may organize photons associated with the light into, e.g., a rainbow pattern or structure.

From the grating 104, the light may be provided to a spectral DLP 106. The spectral DLP 106 may be configured to select one or more colors for a particular scene or image being rendered.

From the spectral DLP 106, the light may be provided to an integrating sphere 108. The integrating sphere 108 may mix the colors selected by the spectral DLP 106.

From the integrating sphere 108, the light may be provided to a spatial DLP 110. The spatial DLP 110 may be used to create an actual image or shape, which may be provided to a camera 112 for rendering/display.

The system 100 is illustrative. In some embodiments, the entities may be organized or arranged in a manner or sequence that is different from what is shown in FIG. 1. In some embodiments, one or more of the entities may be optional. In some embodiments, additional entities not shown may be included. For example, a spectrometer may be used to obtain information (e.g., real-time information) on the spectral content or the number of photons in a given spectrum. The spectrometer may be used for purposes of calibration.

In terms of the creation of digital infrared (IR) holograms, and working with a 7-12 micrometer wavelength band, in an ideal environment a material or mirror system would enable an inducement of micron level phase changes in (substantially) real-time. FIGS. 2A-2B illustrate two techniques that could be used to realize such a phase change.

As shown in FIG. 2A, light 202 may be incident on a surface of a material/mirror system 204. A first portion or segment of the material 204a may be offset by a given distance with respect to one or more other portions or segments of the material 204*b*-204*d*, such that a first portion of the light 206*a* that reflects off of the material 204*a* might be offset or out-of-phase with respect to one or more other portions of the reflected light 206*b*-206*d*.

The embodiment shown in FIG. 2B is similar to that described above in connection with FIG. 2A, except the embodiment of FIG. 2B is based on the principle of refraction as opposed to reflection. In FIG. 2B, incoming light 202 is incident upon a material/mirror system 254 composed of different portions or segments. Portion 254*a* may be thicker or wider than portions 254*b*-254*d*, and potentially made of a different material type, such that a first portion of the light 256*a* that emerges from the material 254 (e.g., 254*a*) may be offset or out-of-phase with respect to one or more other portions of light 256*b*-256*d* that emerge from the material 254 (e.g., 256*b*-256*d*).

In either of the embodiments shown in FIGS. 2A-2B, an optical path difference (OPD) is provided that results in a phase shift with respect to light that emerges after having contacted the material/mirror system. The nature or degree of the OPD that is established may dictate an interference pattern that emerges, which may be used to facilitate the generation of different types of holograms.

Figure 3:
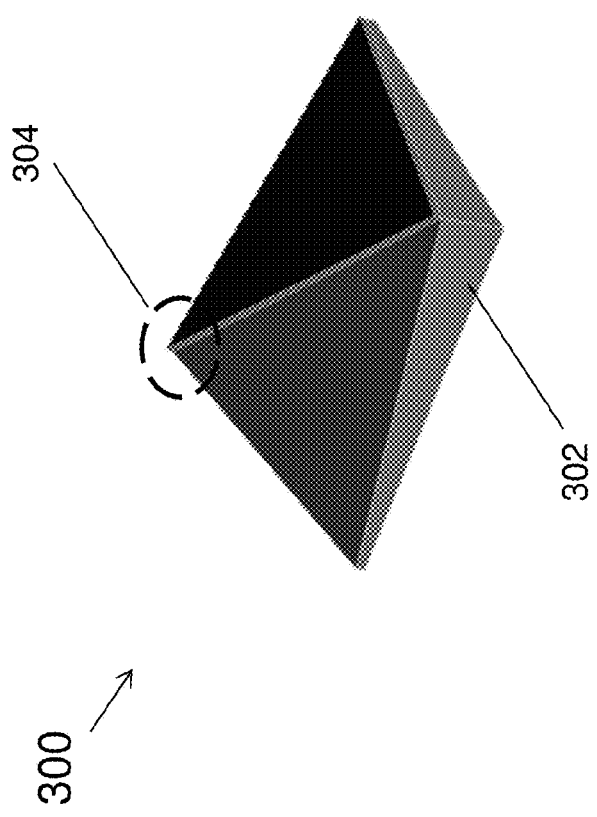
FIG. 3 illustrates an exemplary micro-mirror structure.

Referring to FIG. 3, an embodiment of a structure 300 for one or more portions or pieces of the material/mirrors 204 and 254 is shown. In some embodiments, the structure 300 may be used in connection with a DLP device (e.g., DLP 106 and/or DLP 110). The structure 300 may be used to implement the generation of an OPD phase shift.

The structure 300 may include a base 302 that may allow the structure 300 to rotate or pivot as described further below in connection with FIGS. 4A-4C. At or near the top or apex of the structure 300 a small lip 304 may be present. The rotation about the base 302 may be used to implement principles of reflection (e.g., FIG. 2A) and the lip 304 may be used to implement principles of refraction (e.g., FIG. 2B).

Figure 4A:
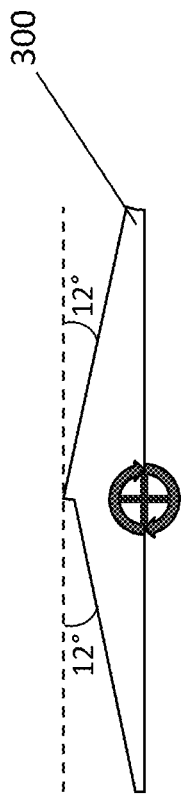
FIGS. 4A-4C illustrate perspective views of the structure of FIG. 3 in a number of exemplary positions.

FIG. 4A may correspond to a neutral or off position for the structure 300. FIGS. 4B-4C may correspond to two different active or on positions for the structure 300. As shown via FIGS. 4A-4C, the structure 300 may be configured to rotate between an angle of, e.g., ±12 degrees. One skilled in the art would appreciate that any angle of rotation may be used.

Figure 4C:
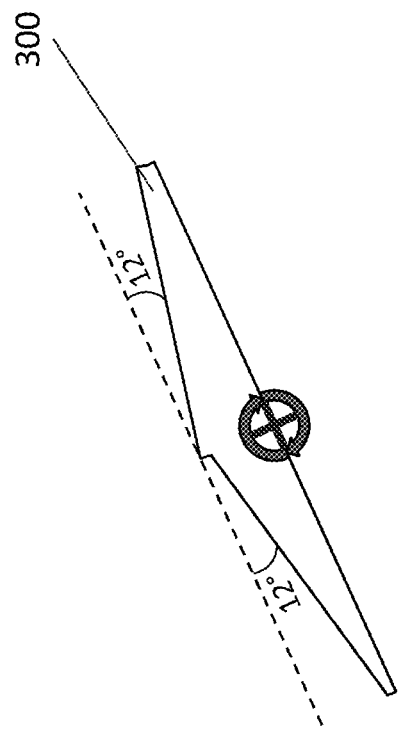
Figure 4B:
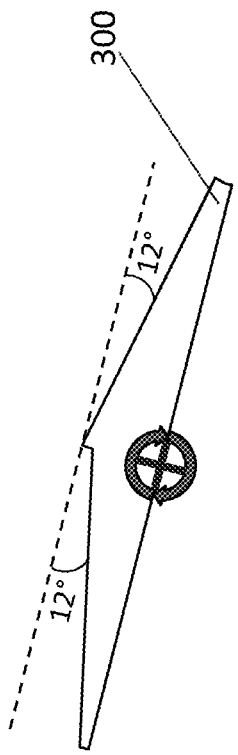

In some embodiments, the three positions or states shown in FIGS. 4A-4C may correspond to the universe of discrete states or positions that the structure 300 can take. In some embodiments, the structure 300 may be configured to rotate in accordance with a range of continuous values/angles. For example, the structure 300 may be able to take on any angle within a range of, e.g., ±12 degrees.

Figure 5:
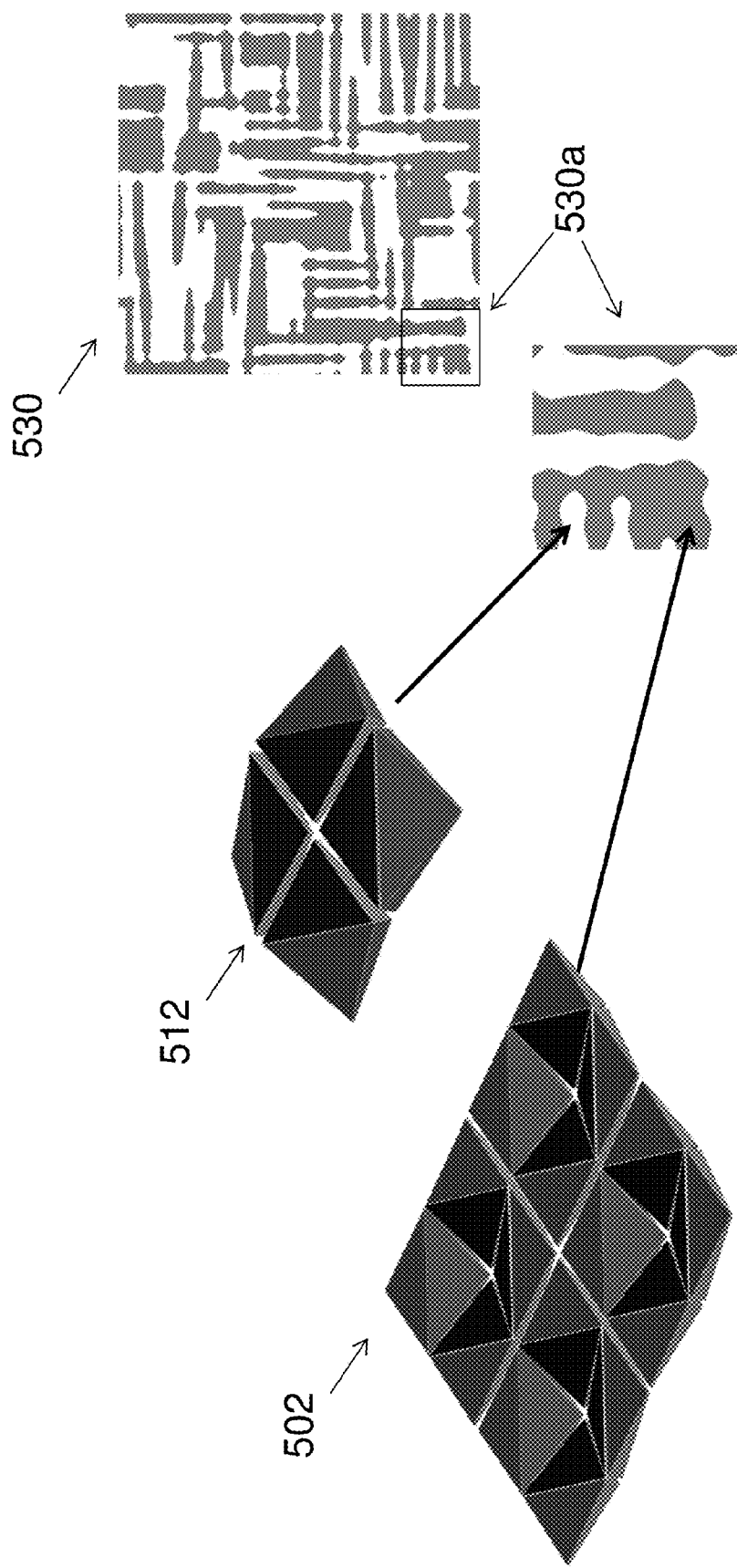
FIG. 5 illustrates an environment for generating an exemplary hologram.

Referring to FIG. 5, an embodiment is shown of a hologram 530 that may be generated by one or more components, devices, or systems, such as those described herein. A portion 530*a* of the hologram 530 is shown in greater detail. The portion 530*a* may be created by one or more groups of mirrors or structures 300. Specifically, two groupings of mirrors, 502 and 512, are shown as having contributed to the generation of the portion 530*a*. The group 502 may induce a phase shift by increased OPD in the portion 530*a*, whereas the group 512 might not induce such a phase shift in the portion 530*a*.

In some embodiments, mirrors/structures 300 may be arranged in groups of four to create a pixel that either induces or does not induce a phase shift. In a reflective system, a 2 micron increase in height may cause a 4 micron OPD, or a one-half wavelength phase difference with a wavelength of 8 micrometers.

Figure 6:
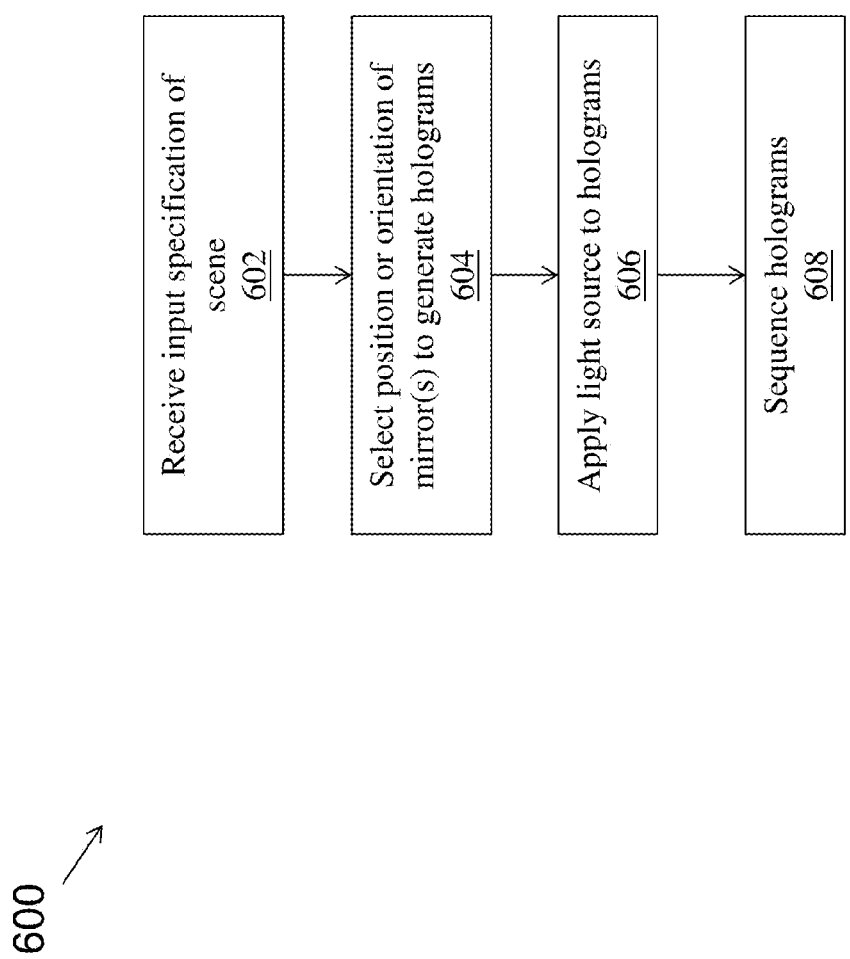
FIG. 6 illustrates a flow chart of an exemplary method.

Referring now to FIG. 6, a flow chart of an exemplary method 600 is shown. The method 600 may execute in accordance with one or more devices, components, or systems, such as those described herein. The method 600 may be used to generate power-efficient, dynamic IR scenes.

In block 602, an input specification of a scene to be generated may be received.

In block 604, the position or orientation of one or more mirrors may be selected. The positions may be selected to generate holograms that adhere to the specification of block 602.

In block 606, a light source (e.g., a laser) may be applied to the holograms generated in block 604.

In block 608, the holograms may be sequenced in block 608. For example, the light source of block 606 may be applied to each of the holograms in turn. The rate or frequency of the sequencing may be selected to be high enough, such that a person perceiving the scene may interpret the output images generated by the transitions between the holograms to be "smooth" and the scene as being "life-like."

Embodiments of the disclosure may be used to generate dynamic scenes in a power-efficient manner. Aspects of the disclosure may combine the dynamic capabilities of a micromirror device with diffractive shaping techniques associated with a hologram to obtain such scenes. The surfaces of micromirror devices associated with a DLP chip may be reshaped relative to conventional micro-mirror DLP devices to induce phase changes needed to create a hologram.

Embodiments of the disclosure may be used in connection with one or more applications. For example, aspects of the disclosure may be used to generate dynamic scenes for purposes of simulations or tutorials, such as training exercises for military personnel. In some embodiments, one or more scenes or images may be created to serve as decoys. For example, on a battlefield if a first tank is real additional, decoy versions of the tank may be generated. The presence of the decoy versions may cause the enemy to be reluctant to fire-on or attack as a result of a strong showing of force, or if the enemy does attack, may cause the enemy to fire-on the decoy tanks initially, thereby providing military personnel additional time to prepare to engage the enemy.

In yet another illustrative use-case, aspects of the disclosure may be used as a beam-shaper for one or more lasers. For example, as light from a laser travels through an environment, the light may tend to become unfocused. The light may become unfocused due to changes in, e.g., wind, temperature, pressure, etc. If a profile for the environment can be established, then one or more holograms may be generated to counter the impact caused by the environment. In this manner, light that would otherwise be unfocused may be (re)focused as a result of applying the light to the holograms.

In some embodiments various functions or acts may take place at a given location and/or in connection with the operation of one or more apparatuses, systems, or devices. For example, in some embodiments, a portion of a given function or act may be performed at a first device or location, and the remainder of the function or act may be performed at one or more additional devices or locations.

Embodiments may be implemented using one or more technologies. In some embodiments, an apparatus or system may include one or more processors, and memory storing instructions that, when executed by the one or more processors, cause the apparatus or system to perform one or more methodological acts as described herein. Various mechanical components known to those of skill in the art may be used in some embodiments.

Embodiments may be implemented as one or more apparatuses, systems, and/or methods. In some embodiments, instructions may be stored on one or more computer-readable media, such as a transitory and/or non-transitory computer-readable medium. The instructions, when executed, may cause an entity (e.g., an apparatus or system) to perform one or more methodological acts as described herein.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

While the preferred embodiments to the invention have been described, it will be understood that those skilled in the art, both now and in the future, may make various improvements and enhancements which fall within the scope of the claims which follow. These claims should be construed to maintain the proper protection for the invention first described.

What is claimed is:

1. A method comprising:
receiving an input specification of a scene;
selecting a position for a plurality of micro-mirrors based on the input specification to generate a plurality of different holograms, each micro-mirror including a lip proximate to an apex of the micro-mirror,
wherein the micro-mirrors are configured to rotate about a base between an off position and at least two on positions to generate at least one optical path difference (OPD), the at least two on positions including a first on position that aligns the lip with a light source to refract light impinging the lip, and a second on position that aligns the base with the light source to reflect light impinging the base,
wherein the OPD defines an interference pattern so as to create a plurality of constantly changing holograms that are used to create a dynamic scene adhering to the input selection.

2. The method of claim 1, wherein the at least two on positions correspond to rotation of a given micro-mirror at angles relative to the off position.

3. The method of claim 2, wherein the angles correspond to discrete angles.

4. The method of claim 2, wherein the angles correspond to angles selected from a continuous range of angles.

5. The method of claim 1, further comprising:
sequencing the holograms; and
applying a light source to each of the sequenced holograms in turn.

6. The method of claim 5, wherein the different holograms are sequenced at a rate that is selected so that a person perceiving the scene may interpret a reduced lag between output images generated by transitions between the different holograms.

7. The method of claim 1, wherein the input specification requests a generation of decoy versions of an actual object present in the scene, and wherein the holograms correspond to the decoy versions.

8. The method of claim 1, wherein the input specification requests holograms to be generated for use as a beam-shaper for a laser, and wherein the holograms implement beam-shaping for the laser.

9. An apparatus for creating a scene, comprising:
a plurality of micro-mirrors configured to rotate between an off position and at least two on positions to generate a plurality of different holograms, each of the micro-mirrors comprising a lip proximate to an apex of the micro-mirror; and
a processor configured to select positions for the micro-mirrors based on an input specification of the scene,
wherein the at least two on positions correspond to rotation about a base of a given micro-mirror at angles relative to the off position, a first on position aligning the lip with a light source to refract light impinging the lip, and a second on position aligning the base with the light source to reflect light impinging the base.

10. The apparatus of claim 9, wherein the angles correspond to discrete angles at approximately +12 degrees relative to the off position at approximately 0 degrees.

11. The apparatus of claim 9, wherein the angles correspond to angles selected from a continuous range of angles.

12. The apparatus of claim 9, wherein the processor is configured to cause the holograms to be sequenced to enable the light source to be applied to each of the holograms in turn.

13. The apparatus of claim 12, wherein a rate that the holograms are sequenced is selected so that a person perceiving the scene may interpret output images generated by transitions between the holograms to be life-like defined by constantly changing the holograms according to the sequence.

14. The apparatus of claim 9, wherein the input specification requests a generation of decoy versions of an actual object present in the scene, and wherein the holograms correspond to the decoy versions.

15. The apparatus of claim 9, wherein the input specification requests holograms to be generated for use as a beam-shaper for a laser, and wherein the holograms implement beam-shaping for the laser.

16. The apparatus of claim 9, wherein the micro-mirrors are arranged in groups of four.

17. A system comprising:
a light source configured to emit light;
at least one digital light processing (DLP) device configured to receive the light to generate an infrared (IR) dynamic scene,
wherein the at least one DLP device comprises a plurality of micro-mirrors arranged in groupings of four micro-mirrors, and
wherein each of the micro-mirrors is configured to rotate about a base between an off position and at least two on positions, and
wherein each of the micro-mirrors comprises a lip proximate to an apex of the micro-mirror, the lip is configured to initiate a first on position that refracts the received light among the at least two on positions and the base is configured to initiate a second on position that reflects the received light among the at least two on positions, and
wherein a position for each of the micro-mirrors is selected to generate at least one optical path difference (OPD) that defines an interference pattern so as to create a plurality of constantly changing holograms that are used to create the dynamic scene.

* * * * *